United States Patent [19]

Uemura et al.

[11] 3,932,080

[45] Jan. 13, 1976

[54] APPARATUS FOR MANUFACTURE OF TUBULAR FILM FROM THERMOPLASTIC RESIN

[75] Inventors: Osamu Uemura; Kiyoshi Fujita, both of Yokohama; Takeshi Onoda, Hiratsuka, all of Japan

[73] Assignee: Showa Denko Kabushiki Kaisha, Tokyo, Japan

[22] Filed: Aug. 28, 1974

[21] Appl. No.: 501,236

Related U.S. Application Data

[62] Division of Ser. No. 330,234, Feb. 7, 1973, Pat. No. 3,886,243.

[30] Foreign Application Priority Data

Feb. 15, 1972 Japan............................ 47-15251
Feb. 15, 1972 Japan............................ 47-17955

[52] U.S. Cl. .............. 425/71; 425/72; 425/140; 425/326 R; 425/380; 425/388; 425/404
[51] Int. Cl.² ........................................ B29C 17/00
[58] Field of Search............. 264/89, 95, 178 R, 180, 264/237, 40; 425/72, 140, 141, 326 R, 325, 404, 387 R, 388, 67, 68, 71, 380

[56] References Cited
UNITED STATES PATENTS

| | | | |
|---|---|---|---|
| 3,142,092 | 7/1964 | Ralston | 425/71 |
| 3,159,698 | 12/1964 | Suh et al. | 425/DIG. 16 |
| 3,400,184 | 9/1968 | Matsuo et al. | 425/72 X |
| 3,532,780 | 10/1970 | Kakutani et al. | 425/71 X |
| 3,819,790 | 6/1974 | North et al. | 425/71 X |
| R26,991 | 11/1970 | Luca | 425/71 X |

Primary Examiner—R. J. Shore
Assistant Examiner—Mark Rosenbaum
Attorney, Agent, or Firm—Kemon, Palmer & Estabrook

[57] ABSTRACT

An apparatus for manufacturing a tubular film from thermoplastic resin which comprises an extruder fitted with an annular die; a mechanism for introducing air into a tubularly inflated film; a cylindrical water cooler which consists of an annular cooling water reservoir disposed at the upper part, a cap member covering said water cooling reservoir, a vacuum sizing chamber positioned below said cooling water reservoir, an annular cooling water discharging chamber located below said sizing chamber and an annular vacuum suction chamber bored with a suction port so as to remove residual water, the underside of said cap member and the upper side of said sizing chamber defining an annular passageway of cooling water; a mandrel received in the cylindrical water cooler so as to internally cool the tubular film; and a film take up mechanism.

4 Claims, 8 Drawing Figures

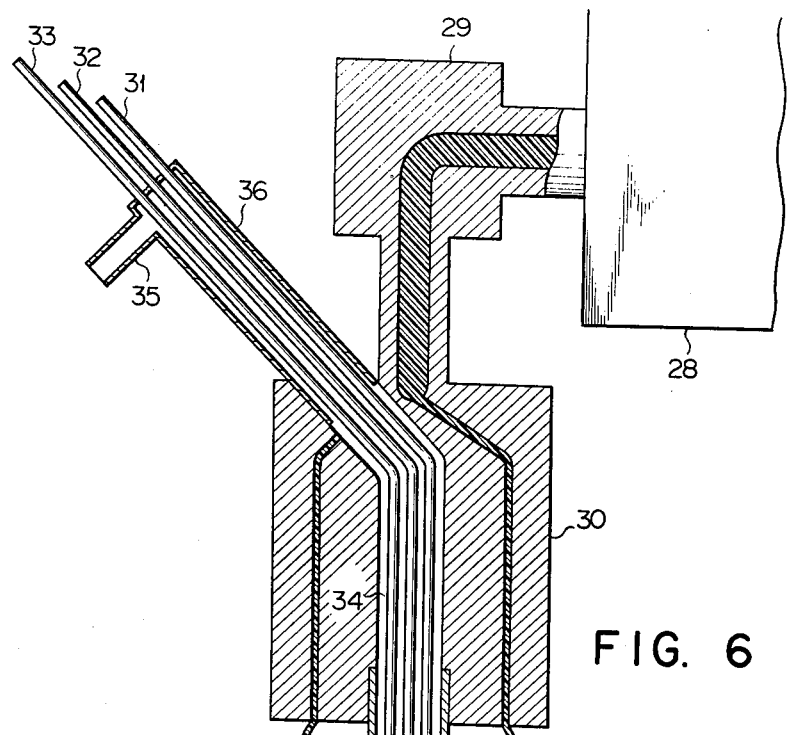
FIG. 6
FIG. 7
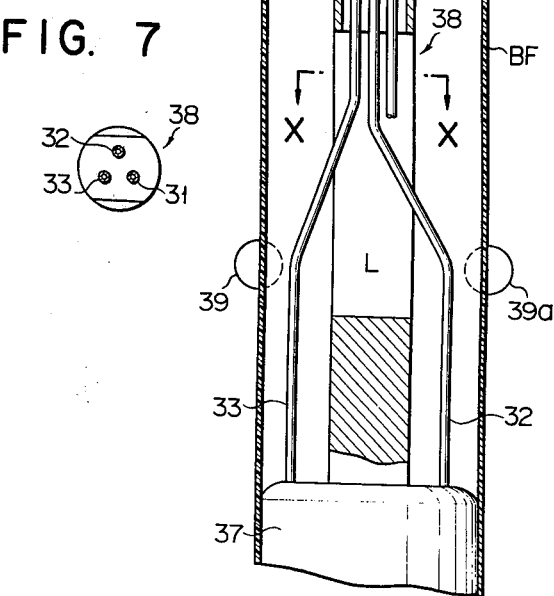

APPARATUS FOR MANUFACTURE OF TUBULAR FILM FROM THERMOPLASTIC RESIN

This is a division of application Ser. No. 330,234, filed Feb. 7, 1973, now U.S. Pat. No. 3,886,243.

This invention relates to a method and apparatus for manufacturing by the water-cooled inflation process tubular film adapted to make raw film at least as thick as 200 microns and thin walled pipes.

Customary practice of making a tubular film is to extrude molten resin through an annular die fitted to an extruder, conduct air into the thus obtained tubular film through the control opening of the annular die and continuously mold the resin into a tubular film with the inner pressure of the tubular film kept at a proper level. This process generally enables a tubular film to be molded with a larger diameter than that of the annular die. Hitherto, a molded tubular film has been slowly cooled only by air, decreasing productivity. Therefore, various methods of cooling a tubular film with water have been proposed to eliminate such drawback.

A typical example of a mechanism for cooling a molded tubular film with water comprises, as shown in FIG. 1, a cylindrical water cooler A, a cooling water reservoir B provided on the upper surface of said cooler A, an annular weir C provided on the upper inner wall of the cooling water reservoir B, and is designed to conduct cooling water downward through said annular weir C along the outer wall of a tubular film F and take up the finished tubular film. With such film cooling mechanism, the tubular film tends to be expanded (indicated in broken lines) or contracted (illustrated in solid lines), until the film is actually brought into contact with the inner wall of the cylindrical water cooler. Said expansion temporarily obstructs the downward flow of cooling water due to the tubular film sticking to the inner wall of the cooler, resulting in the insufficient cooling of the tubular film or the raised water level. Conversely, said contraction gives rise to a gap between the periphery of the tubular film and the inner wall of the cylindrical water cooler, causing cooling water to run rapidly through said gap. During the repeated occurrence of said expansion and contraction, the molten tubular film eventually sticks itself to the cooler body to obstruct its complete molding. Though the cause for appearance of such event has not yet been fully understood, it may be pointed out as one reason that the cooling capacity has not attained the required level.

A thick tubular film leads to considerably insufficient cooling with the resultant occurrence of the above-mentioned difficulties.

With the customary inflation process, the inner pressure of a tubular film is only kept at about 0.5 mm or 5 mm Aq. However, a film as thin as 10 to 40 microns, even after cooled, tends to be pressed against the inner wall of a cylindrical water cooler by said inner pressure thus retaining a tubular form. Conversely, a thicker film, after cooling, hardly presents a tubular form under such low pressures. This tendency becomes more prominent, as a thicker film is used.

It is accordingly an object of this invention to provide a method and apparatus for manufacturing from thermoplastic resin a tubular film free from the aforesaid drawbacks and presenting greater moldings stability. Another object of the invention is to provide an improved mandrel for said apparatus. Still another object is to provide an improved air precooling mechanism so as to attain the more efficient cooling of a tubular film. A further object is to provide a method and apparatus for automatically controlling the diameter of a tubular film by providing an electric element for detecting said diameter.

According to an aspect of this invention, there is provided an apparatus for manufacturing a tubular film from thermoplastic resin which comprises:
a. an extruder fitted with an annular die;
b. a mechanism for supplying prescribed volumes of air to form a tubular film with a desired diameter;
c. a round cylindrical water cooler having an annular cooling water reservoir disposed at the upper part of said cooler, a cap member covering said cooling water reservoir, an annular vacuum sizing chamber positioned below said cooling water reservoir and having its inner wall bored with suction ports, an annular cooling water discharging chamber located below said vacuum sizing chamber and an annular vacuum suction chamber bored with a suction port to remove residual water, the underside of the cap member and the upper side of the vacuum sizing chamber defining an annular passageway of cooling water;
d. a mandrel received in the cylindrical water cooler to cool the tubular film; and
e. a mechanism for taking up the finished tubular film.

The present invention can be more fully understood from the following detailed description when taken in connection with reference to the accompanying drawings, in which:

FIG. 6 is a sectional view of air introducing and drawing off mechanisms and a mandrel included in the automatic control device of the tubular film diameter;

FIG. 7 is a cross sectional view on line X—X of FIG. 6; and

Figure 1:
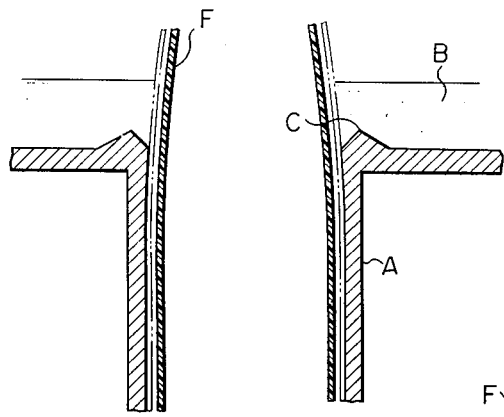
FIG. 1 is a schematic diagram showing the step of cooling a tubular film in the prior art cylindrical water cooler.

The invention will now be described by reference to FIG. 2. A tubular film F extruded through an annular die 1 is conducted into a cylindrical water cooler 2 which has a cooling water reservoir 3 provided at the upper part; a vacuum sizing chamber 4 disposed below said cooling water reservoir 3, the upper side of said vacuum sizing chamber 4 and the underside of a cap member 5 covering the cooling water reservoir 3 defining an annular passageway 6 of cooling water, and the cooling water reservoir 3 concurrently acting as a hydraulic pressure controlling tank; and an integral assembly of a cooling water discharging chamber 5a and a vacuum suction chamber 6a located below the vacuum sizing chamber 4. The outer wall of the vacuum sizing chamber 4 is made of metal whose slightly rough finish has been experimentally found to render the surface of a tubular film desirably smooth. The reason is that said slightly rough finish prevents the tubular film from sticking to the surface of the metal of said vacuum sizing chamber 4. The outer walls of the cooling water discharging chamber 5a and vacuum suction chamber 6a are coated with a soft cooling element 7 made of, for example, cloth or spongy matter bearing mutually communicating fine cells.

Most of the cooling water supplied to the reservoir 3 through a water pipe 8 uniformly turns through the annular passageway 6 in the form of flat streams along the inner wall of the cylindrical water cooler 2 in contact with the outer periphery of the tubular film F. However, some portion of the cooling water flows upward opposite to the travelling direction of the tubular film F, namely, runs outside of the cooling water reservoir 3 after passing beyond the cap member 5.

When subjected to vacuum sizing, therefore, the tubular film F presents a smooth surface by the joint action of the slightly roughly finished surface of the metal constituting the outer wall of the vacuum sizing chamber 4 and the flat streams of cooling water.

Even when the tubular film F tends perchance to expand and contact the upper inner wall of the cylindrical water cooler 2, the cooling water delivered through the annular passageway 6 has a higher pressure than the inner pressure (about 1 mm Aq) of the tubular film F and presses the tubular film F inward to provide a gap between said film F and the inner wall of the cylindrical water cooler 2, thereby enabling the cooling water to run down smoothly. The cap member 5 has a larger inner diameter d than the inner diameter D of the cylindrical water cooler 2. Therefore, even where the amount of downward cooling water decreases when the diameter of the tubular film F increases as to approach the inner wall of the cylindrical water cooler 2 due to the elevated blow molding pressure in the tubular film F, then a larger amount of the cooling water runs in the opposite direction to that in which the tubular film F travels through a gap defined between the inner wall of the cap member 5 and the outer periphery of said film F beyond the cap member 5 to the outside of the cylindrical water cooler 2, thus preventing the cooling effect from appreciably decreasing. To this end, it is necessary to control a water valve so as to supply the cylindrical water cooler 2 with both downward and upward streams of cooling water. The amount of cooling water thus controlled is, for example, 1.25 m³/h at normal temperature when a tubular film being cooled has a thickness of 700 microns, a folded width of 154 mm and is taken up at a speed of 2.4 m/min.

The overflow of cooling water is drawn off through an overflow pipe 9. In this case, the raised portion of the upper surface of the cap member 5 acts as a weir to fix the amount of overflowing cooling water and consequently the height H of the water remaining on the cap member 5, thereby enabling the tubular film F to be initially cooled always at a fixed point on the cylindrical water cooler while it is travelling downward. A downward moving tubular film is subjected to vacuum sucking through suction ports 10 bored in the inner wall of the vacuum sizing chamber 4 by means of a suction pipe 11 just before the frost line of the tubular film (a point at which the film begins to be crystallized). At this time, the tubular film is further cooled with a watercooled mandrel M positioned therein finally to take a tubular form having a desired diameter. The cylindrical water cooler 2 and internal mandrel M according to this invention enable a thick-walled tubular film to be uniformly formed with a smooth surface under a stable condition. The internal mandrel M not only carries out the above-mentioned cooling but also plays the following part. A thick tubular film can not be cooled into a solid round form simply by the vacuum sizing means and a relatively low pressure prevailing in said tubular film, but tends to be deformed inward. However, the internal mandrel M prevents such deformation.

The cylindrical water cooler of this invention ensures that flat streams of cooling water always run down the inner wall thereof and the film is externally cooled at a constant rate by the joint action of the upward flow of cooling water. Further, the internal mandrel attains the effective internal cooling of the tubular film and in consequence its smooth formation. Namely, a molten tubular film is directly quenched from the outside by the downward and upward streams of cooling water as well as indirectly by the surface metal of the mandrel and thin layers of air adjacent thereto cooled by the water in the mandrel. The internal pressure of the tubular film prevents it from sticking to the periphery of the mandrel, namely, causes it to remain slightly apart therefrom, thus enabling the tubular film to be formed under a stable condition without giving rise to any scar on the inner surface of the tubular film while it is sliding through the cylindrical water cooler.

Figure 2:
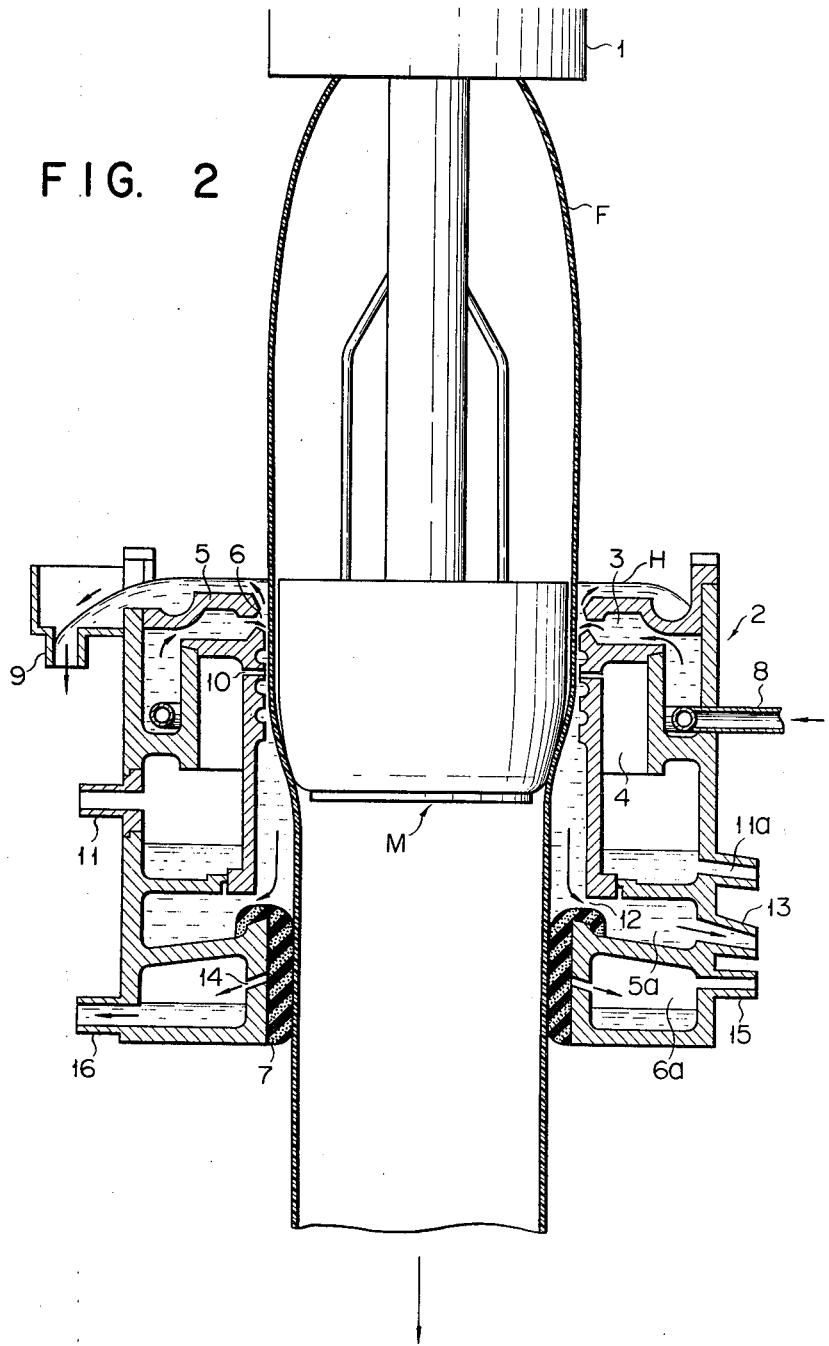
FIG. 2 shows the arrangement of the apparatus of this invention for cooling the tubular film.

Further, as shown in FIG. 2, it is preferred that the top side of the mandrel be disposed at a substantially equal position to the level of cooling water. Any excessive increase in either the height of the top side of the mandrel or the cooling water level gives undesirable results. If the mandrel is positioned higher than said water level, then the tubular film will be cooled insufficiently, possibly marring the inner surface of the tubular film due to the tubular film sticking to the mandrel. On the other hand, a higher water level causes the tubular film to be deformed inward due to higher water pressure being applied to the outside of the film, making its formation unstable. The aforementioned mandrel will be later detailed by reference to FIG. 4.

When the tubular film is subjected to vacuum sucking, part of the cooling water flows downward through the suction ports 10 into the vacuum sizing chamber 4 and, after being retained there for some time, it is drawn off to the outside through an exhaust 11a. Most of the cooling water is conducted into the discharging chamber 5a through an inlet port 12 and drained through an exhaust 13. The travelling film is further conducted to the cooling element 7 of cloth or spongy material provided on the outer wall of the vacuum suction chamber 6a. At this time, suction ports 14 bored in the inner wall of said chamber 6a attract the film to the surface of the cooling element 7, and the cooling water absorbed in said element 7 is sucked through a vacuum suction pipe 15 and drawn off through an exhaust 16. The cooling element concurrently acts as a seal for preventing the cooling water from leaking to the outside from the bottom of the cylindrical water cooler. The level H of the water remained on the cap member 5 is suitably chosen in consideration of the relationship of, for example, the internal pressure and the thickness of the tubular film.

Figure 3:
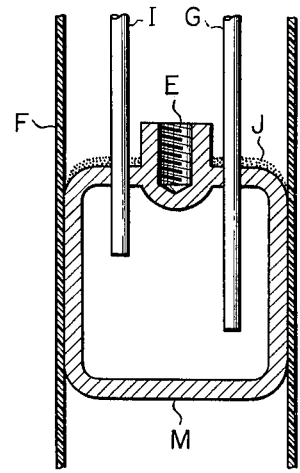
FIG. 3 is a sectional view of the prior art mandrel.

There will now be described a novel type of mandrel according to this invention. As previously mentioned, provision of a mandrel in the cylindrical water cooler enables a tubular film of thermoplastic resin to be uniformly produced under a stable condition. The mandrel is supported by a pipe suspended from the underside of an annular die. Hitherto, the mandrel M has been formed into a hollow cylindrical shape illustrated in FIG. 3, provided at the center of the top wall with a threaded section E for engagement with the suspended pipe, and further fitted with an inlet pipe G and outlet pipe I of cooling water.

However, a mandrel of such arrangement has the drawbacks that an additive, for example, an antioxidant incorporated in a synthetic resin constituting a tubular film sometimes is evaporated by high extrusion temperature; the vapors of said additive is condensed on the top side of the mandrel to form a solid deposit J; when said deposit prominently grows, part of it is carried along with the tubular film F or comes off to attach itself to the film F, eventually soiling it; and a noticeable deposition of said solidly condensed additive exerts a harmful effect on the film F such as deforming its shape or giving rise to scars on its surface while it slides through a cylindrical water cooler. Accordingly, the prior art mandrel must have its surface cleaned from time to time, decreasing productivity by that extent.

There will now be further detailed by reference to FIG. 4 the mandrel of this invention which has been devised to resolve the aforesaid difficulties.

Figure 4:
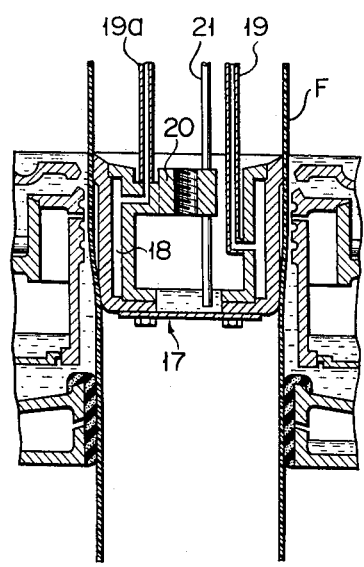
FIG. 4 is a sectional view of the mandrel of the invention.

Referring to FIG. 4, referential numeral 17 denotes a mandrel built into a cup shape. In the mandrel 17 is formed an annular cooling water passageway 18 to which there are connected an inlet pipe 19 and outlet pipe 19a of cooling water. To the annular passageway 18 is fitted an arm 20, to which there is fixed a mandrel-supporting pipe. The mandrel 17 further contains an upright suction pipe 21 whose lower end closely faces the inner bottom surface of the mandrel 17. In this case, it is preferred that the mandrel 17 should have such an outer diameter as gently decreases toward the bottom so as to match the extent of contraction of a molten tubular film F upon cooling, namely, that the mandrel 17 as a whole should have a peripheral surface bearing a conical or similar curvature, or an inwardly tapered cross section as shown in FIG. 4. Such shape of the mandrel 17 not only prevents the tubular film F from sticking to the peripheral surface of the mandrel 17 but also avoids a tight contact therebetween and yet eliminates decrease in the cooling effect. The peripheral surface of the mandrel 17 is made of metal and should preferably be so roughly finished as to cause the resultant fine depressions collectively to present a network pattern of about 70 to 150 mesh. Such rough finish has been experimentally found to give good results. An extremely smooth mirror-like finish of the mandrel surface rather undesirably accelerates the sticking of the tubular film to the mandrel surface.

The above-mentioned construction of the mandrel 17 enables the vapors of an additive incorporated in a synthetic resin constituting a tubular film to be cooled into a condensate, for example, on the upper surface of the mandrel 17 and collected at its bottom by flowing down the inwardly tapered peripheral wall of the mandrel 17. Therefore, when collected to a prescribed amount during operation, the condensate can be easily drawn off to the outside by vacuum suction through the suction pipe 21. Further, the mandrel of this invention prevents a condensate deposited on its upper surface from being solidified as is the case with the prior art mandrel, thus avoiding difficulties resulting from said solidification, and offering the advantage of forming a tubular film continuously for long hours under a stable condition.

There will now be described an air precooler included in the apparatus of this invention which is intended to cool with air a molten tubular film extruded from an annular die before it is conducted into a cylindrical water cooler.

Hitherto, precooling of a tubular film has been effected with air. A tubular film can indeed be more effectively precooled by ejecting large volumes of air on the periphery of the tubular film than by using small amounts thereof. However, ejection of large volumes of air leads to the occurrence of its vortical streams around the periphery of the tubular film, with the resultant unstable shaking of the tubular film. Once started, said shaking is more and more accelerated, presenting considerable difficulties in effecting the continuous formation of a tubular film under a stable condition. The shaking is supposed to originate with a combination of complicated factors including, for example, air streams flowing along the periphery of the tubular film and the properties displayed by a tubular film while it is cooled. However, the theoretical analysis of the actual cause of the shaking has not been fully carried out.

If a tubular film is precooled with sufficiently small volumes of air to avoid the appearance of said shaking, then there will arise the disadvantages that the film will have to travel a longer distance than otherwise before it enters a cylindrical water cooler, in order to attain a proper degree of cooling, with the resultant failure to finish the tubular film with high dimensional precision.

There will now be described by reference to FIG. 5 the mechanism of an air precooler according to this invention which has been devised to eliminate the above-mentioned difficulties.

Figure 5:
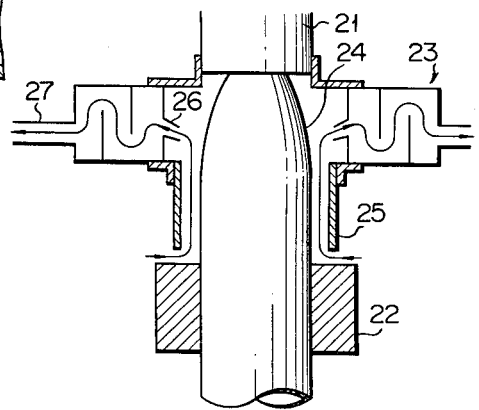
FIG. 5 is a sectional view of the air cooling mechanism of the invention.

Referring to FIG. 5, referential numeral 21 is an annular die, 22 an cylindrical water cooler and 23 an annular air cooler. To the annular air cooler 23 is fitted a draft tube 25 so as to surround a tubular film 24. The annular air cooler 23 has an annular inwardly projecting narrow sucking duct 26 fitted to the inner wall and an air suction pipe 27 provided on the outer wall. Said duct may be replaced by a slit or hole. Under the above-mentioned arrangement, sucked air flows in the direction of the indicated arrow through a space defined between the inner wall of the draft tube 25 and the periphery of the tubular film 24 for its cooling. If, in this case, air travels through said space in turbulent streams, the tubular film does not present any shaking. Though the reason has not been fully understood, it is assumed that said turbulent streams of air statically act on the periphery of the tubular film instead of dynamically as when air is directly ejected thereto.

An air precooler of a tubular film according to this invention constructed as described above does not give rise to the shaking of the film even when larger amounts of air are applied than in the prior art air ejection precooler, thereby attaining the stable formation of the film.

Figure 8:
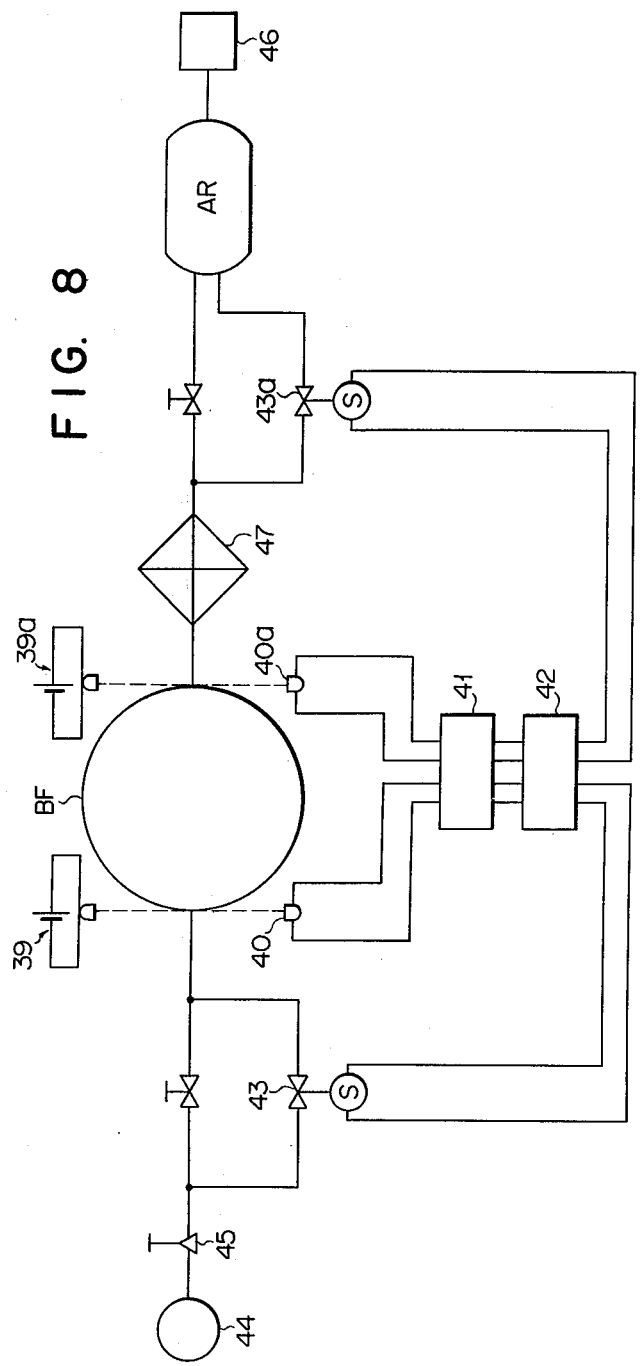
FIG. 8 is a diagram of a system for automatically controlling the diameter of the tubular film of the invention.

There will now be described by reference to FIGS. 6 to 8 the method and device of this invention for automatically controlling the diameter of a tubular film extruded through an annular die. Throughout the figures, referential numeral 28 denotes an extruder, 29 a die head and 30 an annular die. This annular die 30 is bored at the center with a penetrating hole 34 through which to insert an air blowing copper pipe 31, a copper pipe 32 for supplying a cooling medium (water) to a mandrel 37 and a cooling water discharging copper pipe 33. To the top end of the penetrating hole 34 is connected a pipe or jacket 36 enveloping the aforesaid three copper pipes 31, 32 and 33, said enveloping pipe or jacket 36 being integrally provided with an air sucking pipe 35. The enveloping pipe 36 and penetrating hole 34 jointly serve for suction of air. To the bottom end of the penetrating hole 34 is fitted a suspended pipe 38 supporting a mandrel 37. The suspended pipe 38 has an opening L cut out at the intermediate part as shown in FIG. 6. The pipe for supplying a cooling medium (water) to the mandrel 37 and the cooling water discharging pipe 33 are connected to the mandrel 37 through said cutout opening L. The air blowing pipe 31 is left open at the lower end.

Molten resin is extruded through the annular die 30 into a tubular film BF. Before reaching the cooling mandrel 37, the tubular film BF has its diameter detected by a detecting element consisting of two light projectors 39 and 39a and two light receivers 40 and 40a (photocells) grouped as 39–40 and 39a–40a (FIG. 8). Namely, where a tubular film BF has a larger diameter than prescribed, the light projector 39a gives forth a decreased amount of parallel beams and the light receiver or photocell 40a detects said decreased parallel beams. Conversely, where the tubular film BF has a smaller diameter than prescribed, the light projector 39 produces an increased amount of parallel beams and the light receiver or photocell 40 detects said increased parallel beams.

Where the tubular film BF has a smaller diameter than desired, the resulting amount of parallel beams delivered by the light projector 39 are detected by the photocell 40, and an air supply valve 43, for example, a solenoid valve is opened through a meter relay 41 and control circuit 42. Thus air supplied from a blower 44 has its pressure reduced by a pressure reducing valve 45 to a lever required to increase the diameter of the tubular film BF and introduced into the tubular film BF through the air blowing pipe 31, thereby causing the tubular film BF to have its diameter increased as desired. Where the tubular film BF has a larger diameter than specified, the parallel beams sent forth by the light projector 39a are obstructed in passage by the expanded tubular film BF, failing to reach the light receiver or photocell 40a. As the result, operation is controlled in the opposite manner to the case where additional air is supplied to supplement the insufficient diameter of the tubular film BF. Namely, an air suction valve 43a is opened and air in the tubular film BF is drawn off by a vacuum pump 46 through the penetrating hole 34 bored in the annular die 30 and the suction pipe 35 to reduce the increased diameter of the tubular film BF. Ahead of the vacuum pump 46 is disposed an accumulator AR to stabilize the pressure of air when it is drawn out of the tubular film BF. Ahead of the air suction valve 43a is preferably provided a conventional cleaner 47.

The aforementioned device for automatically controlling the supply of compressed air to and its withdrawal from a tubular film by an element for detecting the diameter of a tubular film which comprises two independent groups each consisting of a light projector and light receiver can be operated most economically due to the simplified mechanical and electrical equipment, the durability of the device itself and the stability of the control system.

Where there is used a large-scale apparatus for manufacturing a tubular film, or where demands are made with respect to operating conditions, the aforesaid electric solenoid valve may be replaced by an air servo valve, using a device for converting produced electric energy to the corresponding pneumatic energy.

This invention can minimize variation in the diameter of a tubular film by automatically controlling the amount of cooling air introduced into or withdrawn from the interior of the tubular film, attaining the manufacture of a tubular film with uniform quality under a stable condition.

This invention will be more fully understood with reference to the examples which follow.

EXAMPLE 1

A nonstretched tubular film was molded using a cylindrical water cooler shown in FIG. 2 under the following conditions:
Raw resin: polypropylene (manufactured by Showa Yuka Company under a trademark "Shoallomer") having a melt index (m.I.) of 2 g/10 min.

| Extruder temperature: | | | |
|---|---|---|---|
| Cylinder | $C_1$ 240 °C | $C_2$ 250 °C | $C_3$ 210 °C |
| Head | $H_1$ 200 °C | $H_2$ 200 °C | |
| Die | D 200 °C | | |

Die inner diameter: 100 mm
Folded width of tubular film: 154 mm
Thickness of the film: 776 microns
Degree of vacuum in cylindrical water cooler: 100 mm Hg
Inner diameter of cylindrical water cooler: 104 mm
Suction ports arranged in two lines in staggered fashion in the vacuum sizing chamber:
  Diameter of each port: 1mm
  Pitch between two adjacent ports: 10 mm
Mandrel diameter: 100 mm
Film take up speed: 2.4 m/min.

A nonstretched tubular film produced under the above conditions presented a smooth, scarless surface and was free from the sagging or zigzag deformation of its periphery, and displayed such molding stability that no difficulties took place during a continuous operation of 120 hours. The above raw tubular film was made into an inflated tubular film by biaxially stretching it 6.5 times in the machine direction (M.D.) and 6.5 times in the transverse direction (T.D.). The product displayed a clear transparent sagless appearance with its thickness varied within the range of ±6%.

EXAMPLE 2

A nonstretched tubular film was molded using the cylindrical water cooler of FIG. 2 under the following conditions:
Raw resin: high density polyethylene (manufactured by Showa Yuka Company under a trademark Sholex) having a melt index of 0.2 g/10 min.

| Cylinder | $C_1$ 203 °C | $C_2$ 230 °C | $C_3$ 236 °C |
|---|---|---|---|
| Head | $H_1$ 233 °C | $H_2$ 213 °C | |
| Die | D 215 °C | | |

Die inner diameter: 100 mm
Folded width of tubular film: 154 mm
Thickness of the film: 605 microns
Evacuation of cylindrical water cooler: 110 mm Hg
Inner diameter of cylindrical water cooler: 104 mm
Suction ports arranged in two lines in staggered fashion in the vacuum sizing chamber:
  Diameter of each port: 1 mm
  Pitch between two adjacent ports: 10 mm
Mandrel diameter: 100 mm
Film take up speed: 2.4 m/min.

A nonstretched tubular film produced under the above conditions indicated, as in Example 1, a smooth, scarless surface and was free from the sagging or zigzag deformation of its periphery, and displayed such molding stability that no difficulties occurred during a continuous operation of 144 hours. The above raw tubular film was made into an inflated tubular film by biaxially stretching it 6.15 times in the machine direction and 6.5 times in the transverse direction. The product has a suitable toughness like tissue paper and presented a clean, sagless appearance with its thickness varied within the range of ±6%.

EXAMPLE 3

A nonstretched tubular film was produced under the following conditions with the view of proving the effect of an air cooler used in the apparatus of this invention.
Raw resin: high density polyethylene having a melt index of 0.2 g/10 min.
Molding conditions:
  Screw rotation velocity: 72 r.p.m.
  Extrusion speed: 30.5 kg/hr.
  Die outlet temperature: 200 °C
  Diameter of inflated tubular film: 100 mm
  Film take up speed: 3.2 m/min.
  Thickness of the film: 750 microns
Specification of an air cooler according to this invention:
  Inner diameter of the draft tube: 200 mm
  Length from the underside of the die to the lower end of the draft tube: 300 mm
  Distance between the lower end of the draft tube and the upper end of the cylindrical water cooler: 100 mm When a tubular film extruded through an annular die was precooled with air sucked at the rate of 3.5 m³/min., it did not present any shaking. When the effect of the present air cooler was examined by an infrared surface thermometer, the tubular film indicated a temperature of 160°C on the average just before reaching the water cooling mandrel, proving that the present air cooler precooled the tubular film as much as 40 °C from its initial extruded temperature of 200 °C.

CONTROL

This experiment was made to prove the effect of the present air cooler more distinctly. A tubular film was molded under the same conditions as in Example 3, but using the conventional cylindrical air cooler which was operated by ejecting streams of cooling air at 10 °C on the tubular film in the peripheral direction thereof through a slit 2 mm wide bored all around said cooler.

When cooling air was ejected on the tubular film at the rate of 1 m³/min., the film presented shaking, failing to be continuously formed. Said shaking was found to have an amplitude of 2 to 3 mm and take place about 100 times per minute. Further when the effect of said conventional cylindrical air cooler was examined by an infrared surface thermometer, the tubular film indicated a temperature of 190 °C on the average just before reaching the water cooling mandrel, showing that the conventional air cooler precooled the tubular film only 10 °C from its initial extruded temperature of 200 °C.

We claim:
1. Apparatus for manufacture of tubular film from thermoplastic resin comprising:
  A. an extruder provided with an annular die for substantially downward extrusion of thermoplastic resin in the form of a tubular film;
  B. means for supplying a prescribed volume of air to inflate said tubular film;
  C. a cylindrical mandrel positioned below said die for internally cooling said tubular film;
  D. a cylindrical water cooler, concentric with said mandrel, provided with vacuum sizing means for externally cooling and sizing said tubular film,
  E. said cooler having:
    a. an annular cooling water reservoir disposed at the upper part of said cooler,
    b. an annular cap member covering said cooling water reservoir, the upper surface of the cap member acting as a weir to fix the level of an upward stream of water contacting the external surface of said tubular film,
    c. an annular vacuum sizing chamber positioned below said cooling water reservoir and provided with a plurality of air sucking ports for sizing said tubular film,
    d. a cooling water inlet into an annular passageway below said cap member and above said chamber for providing water to produce a first stream of water upwardly to said cap member and a second stream of water downwardly past said chamber with both streams contacting the external surface of said tubular film,
    e. an annular cooling water outlet below said chamber for discharge of water flowing in said second stream of water, and
    f. annular vacuum suction means for removing residual water from said tubular film below said water outlet.

2. Apparatus according to claim 1 wherein said mandrel has an annular passageway of cooling water formed close to the inner wall and connected to a cooling water supply pipe and a cooling water discharging pipe, and an upright condensate sucking pipe received in the mandrel with the lower end of said sucking pipe brought near the bottom of the mandrel where condensate is collected.

3. Apparatus according to claim 1 having air cooling means for precooling said tubular film with sucked air contacting the external surface of said tubular film provided between said extruder and said water cooler, said air cooling means comprising:
  an annular air cooler surrounding said tubular film and provided with inwardly projecting annular air sucking means, and
  a draft tube fitted to said annular air cooler.

4. An apparatus according to claim 1 wherein said annular die is bored at the center with a penetrating hole through which leads an air blowing pipe, and pipes for introducing and drawing off a medium for cooling the mandrel; said penetrating hole is fitted at the upper end with an envelope of said three pipes integrally provided with an air sucking pipe and at the lower end with a suspended pipe connected to the mandrel for its support and bored with an opening at the intermediate part; said pipes for introducing and drawing off a medium for cooling the mandrel pass through said suspended pipe to be connected to the mandrel; the lower end of an air introducing pipe faces said opening; there are provided near the upper peripheral edge of the mandrel a plurality of light projectors and light receivers collectively acting to detect an increase or decrease in the diameter of a tubular film extruded from the annular die; and there is further provided a control circuit for actuating a valve for controlling the amount of cooling air introduced or drawn off upon receipt of a signal from said light receivers.

* * * * *